(12) United States Patent
Chen et al.

(10) Patent No.: US 10,409,871 B2
(45) Date of Patent: Sep. 10, 2019

(54) APPARATUS AND METHOD FOR SEARCHING INFORMATION

(71) Applicant: EMC Corporation, Hopkinton, MA (US)

(72) Inventors: Chao Chen, Shanghai (CN); Qianjie Zhong, Shanghai (CN); Feng Guo, Shanghai (CN); Qiyan Chen, Shanghai (CN); Jingjing Liu, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 470 days.

(21) Appl. No.: 14/100,466

(22) Filed: Dec. 9, 2013

(65) Prior Publication Data

US 2014/0164397 A1 Jun. 12, 2014

(30) Foreign Application Priority Data

Dec. 12, 2012 (CN) .......................... 2012 1 0571064

(51) Int. Cl.
*G06F 16/00* (2019.01)
*G06F 16/9535* (2019.01)
*G06F 16/58* (2019.01)

(52) U.S. Cl.
CPC ...... *G06F 16/9535* (2019.01); *G06F 16/5866* (2019.01)

(58) Field of Classification Search
CPC ......... G06F 17/30011; G06F 17/30864; G06F 17/30994; G06F 3/0482; G06F 16/24578; G06F 16/951; G06F 16/9535; G06F 16/9537; G06F 16/583; G06F 16/248; G06F 16/285; G06F 16/35; G06F 16/95; G06F 16/5866
See application file for complete search history.

(56) References Cited

U.S. PATENT DOCUMENTS

| | | | |
|---|---|---|---|
| 8,782,036 B1 | 7/2014 | Chen et al. | |
| 2002/0107719 A1* | 8/2002 | Tsang | G06Q 10/06375 705/7.29 |
| 2008/0005103 A1* | 1/2008 | Ratcliffe | G06Q 10/10 |
| 2008/0221961 A1* | 9/2008 | James | G06Q 10/06 705/7.14 |

(Continued)

FOREIGN PATENT DOCUMENTS

CN 102750280 10/2012

OTHER PUBLICATIONS

Staab, Steffen, et al. "Knowledge processes and ontologies." IEEE Intelligent systems 16.1 (2001): 26-34.*

(Continued)

*Primary Examiner* — Nan Hutton
(74) *Attorney, Agent, or Firm* — BainwoodHuang

(57) ABSTRACT

The present invention provides a method and apparatus for searching information. The method is for, in response to receipt of a keyword from a search user of a plurality of users, searching in an information repository to obtain one or more information items to be returned; and returning the information item to the search user based on an importance of each information item of the one or more information items. With the method, it is possible to fully leverage various objective internal relationships between search users, information items and creators and thus improve the search accuracy.

20 Claims, 6 Drawing Sheets

(56) References Cited

U.S. PATENT DOCUMENTS

2009/0204590 A1* 8/2009 Yaskin .............. G06F 17/30011
2010/0114561 A1* 5/2010 Yasin .................. G06F 17/3071
 704/9
2010/0228711 A1* 9/2010 Li ..................... G06F 17/30864
 707/706

OTHER PUBLICATIONS

Ginsburg, Mark, and Ajit Kambil. "Annotate: A web-based knowledge management support system for document collections." Systems Sciences, 1999. HICSS-32. Proceedings of the 32nd Annual Hawaii International Conference on. IEEE, 1999.*
Krohn, U., N. J. Davies, and R. Weeks. "Concept lattices for knowledge management." BT Technology Journal 17.4 (1999): 108-116.*

* cited by examiner

APPARATUS AND METHOD FOR SEARCHING INFORMATION

FIELD

Embodiments of the present invention relate to the information search field, and more specifically, to an apparatus and method for information search.

BACKGROUND

With the rapid development of the Internet and database technology, there becomes a great demand for information search, which triggers in-depth research on methods for information search.

Searching for Information in the prior art is typically based on keywords. That is, a user inputs a keyword to be searched for, and a search engine searches an information repository for the keyword and then returns a corresponding result. However, there is a drawback or common thing of these search techniques: they fail to take into consideration possible, objective and internal relationships among various entities (e.g., a searcher, an information item being searched for, and the creator of the information item, etc.) involved in a search, so the search is "planar"; other internal relationships among the searcher, information item and its creator are not leveraged as they exist, so the accuracy is rather low.

SUMMARY

To solve the above problems in the prior art, this specification proposes technical solutions as below.

According to a first aspect of the present invention, there is provided a method for searching information, comprising: in response to receipt of a keyword from a search user of a plurality of users, searching in an information repository to obtain one or more information items to be returned; and returning the information item to the search user based on an importance of each information item of the one or more information items.

In an optional implementation of the present invention, the importance of the each information item is associated with one or more of: a creator weight of the each information item, relevance between the creator and the search user, relevance between the search user and other users of the plurality of users, relevance among the one or more information items, historical interest of the plurality of users in the one or more information items, and impact of the creator on created information items.

In an optional implementation of the present invention, the creator weight is determined based on one or more of: the creator's department, position, domain expertise, geographical location, a clicks ratio of each information item created by the creator, and a historical review of each information item created by the creator.

In an optional implementation of the present invention, the relevance between the creator and the search user is built based on one or more of: department relevance, position relevance, cooperation relationship, domain expertise relevance, and geographical location relevance between the creator and the search user.

In an optional implementation of the present invention, the relevance between the search user and other users of the plurality of users is built based on a search history relationship between the search user and the other users.

In an optional implementation of the present invention, the historical interest of the plurality of users in the one or more information items is built based on a click history of the plurality of users on the information item and/or a review history of the plurality of users on the information item. In a further optional implementation of the present invention, while building the historical interest, historical interest in one information item in a set of information items having relevance to each other is determined as historical interest in other information items in the set of information items.

In an optional implementation of the present invention, the impact of the creator on each created information item is built based on time which the creator spends in creating the information item and/or a review of the creator on each created information item.

In an optional implementation of the present invention, the relevance among the one or more information items is built based on content relevance among the one or more information items. In a further optional implementation of the present invention, the content relevance may be determined by users, machine learning and/or a classification tool.

In an optional implementation of the present invention, the searching in an information repository to obtain one or more information items to be returned further comprises: taking a part of all search results for the keyword that are most closely related to the keyword as the one or more information items to be returned.

In an optional implementation of the present invention, while returning the information item to the user, creator information of the information item is also returned to the user.

In an optional implementation of the present invention, the information repository comprises an information repository for internal usage of an organization, and/or the information item comprises a document.

According to a second aspect of the present invention, there is provided an apparatus for searching information, comprising: a search device configured to, in response to receipt of a keyword from a search user of a plurality of users, search in an information repository to obtain one or more information items to be returned; and a filtering device configured to return the information item to the search user based on an importance of each information item of the one or more information items.

In an optional implementation of the present invention, the importance of the each information item is associated with one or more of: a creator weight of the each information item, relevance between the creator and the search user, relevance between the search user and other users of the plurality of users, relevance among the one or more information items, historical interest of the plurality of users in the one or more information items, and impact of the creator on created information items.

In an optional implementation of the present invention, the apparatus further comprises a creator weight determining device configured to determine the creator weight based on one or more of: the creator's department, position, domain expertise, geographical location, a clicks ratio of each information item created by the creator, and a historical review of each information item created by the creator.

In an optional implementation of the present invention, the apparatus further comprises a creator-user relevance building device configured to build the relevance between the creator and the search user based on one or more of: department relevance, position relevance, cooperation relationship, domain expertise relevance, and geographical location relevance between the creator and the search user.

In an optional implementation of the present invention, the apparatus further comprises an inter-user relevance building device configured to build the relevance between the search user and other users of the plurality of users based on a search history relationship between the search user and the other users.

In an optional implementation of the present invention, the apparatus further comprises a user historical interest building device configured to build the historical interest of the plurality of users in the one or more information items based on a click history of the plurality of users on the information item and/or a review history of the plurality of users on the information item. In a further optional implementation of the present invention, the user historical interest building device may comprises: an associated interest building device configured to, while building the historical interest, determine historical interest in one information item in a set of information items having relevance to each other as historical interest in other information items in the set of information items.

In an optional implementation of the present invention, the apparatus further comprises a creator-information item impact building device configured to build the impact of the creator on each created information item based on time which the creator spends in creating the information item and/or a review of the creator on each created information item.

In an optional implementation of the present invention, the apparatus further comprises an inter-information item relationship building device configured to build the relevance among the one or more information items based on content relevance among the one or more information items. In a further optional implementation of the present invention, the content relevance may be determined by users, machine learning and/or a classification tool.

In an optional implementation of the present invention, the apparatus further comprises a partial result selecting device configured to take a part of all search results for the keyword that are most closely related to the keyword as the one or more information items to be returned.

In an optional implementation of the present invention, the filtering device is further configured to, while returning the information item to the user, also return creator information of the information item to the user.

In an optional implementation of the present invention, the information repository comprises an information repository for internal usage of an organization, and/or the information item comprises a document.

With the above various implementations, it is possible to fully leverage various objective internal relationships within an information repository and thus improve the search accuracy.

BRIEF DESCRIPTION OF THE SEVERAL VIEWS OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
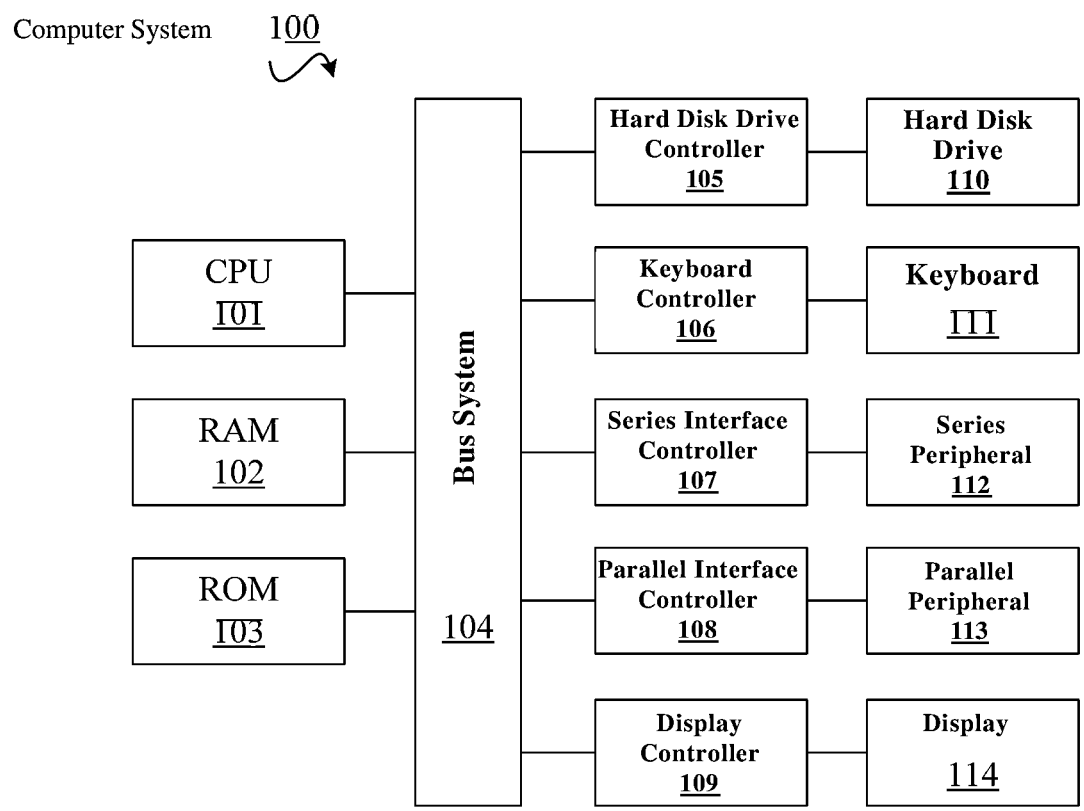
FIG. 1 shows a block diagram of an exemplary computer system 100 which is applicable to implement the embodiments of the present invention.

FIG. 1 shows a block diagram of an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among above devices, CPU 101, RAM 102, ROM 103, Hard Drive Controller 105, Keyboard Controller 106, Serial Interface Controller 107, Parallel Interface Controller 108 and Display Controller 109 are coupled to the System Bus 104. Hard Drive 110 is coupled to Hard Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for the exemplary purpose rather than any limitation to the present invention. In some cases, some devices may be added to or removed from the computer system 100 based on specific situations.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, in some embodiments, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, an electromagnetic signal, optical signal, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instruction means which implements the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Figure 2:
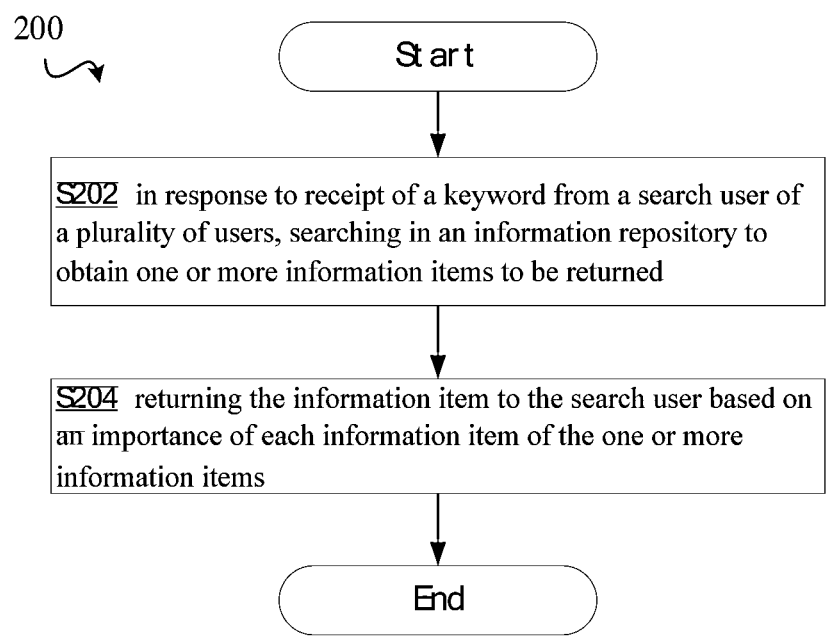
FIG. 2 shows a flowchart of a method 200 for searching information according to one exemplary embodiment of the present invention.

With reference now to FIG. 2, this figure shows a flowchart of a method 200 for searching information according to one exemplary embodiment of the present invention. According to method 200, upon receipt of a keyword from a search user of a plurality of users, the method first proceeds to step S202, where search is carried out in an information repository based on the keyword from the search user, so as to obtain one or more information items to be returned. Those skilled in the art would appreciate that the term "information repository" is in a broad sense, which may include an information repository (or a database) for internal usage of an organization (e.g., an enterprise), an information repository that is involved by search platforms available to the public, and various network information repositories, etc. The term "information item" is also in a broad sense. Besides various types of information in the above-mentioned information repository, the information item may further include various formats of documents. Examples of documents may include, without limitation, documents in ECM system, or Wikis/eRooms, documents in a "word" format, or various documents inside enterprises. The search in step S202 may be implemented using various methods for keyword search in the prior art, and the search result being obtained is also a search result in the normal sense that is obtained after matching the keyword in the search course. Furthermore, in step S202 the one or more information items to be returned may be all search results for the keyword, or part of search results that have been filtered (for example, selecting those search results that are most relevant to the keyword, where there is a huge amount of search results). Usually, the number of the returned information items (as part of or all the search results) is still enormous, and it is necessary to further determine which information items are most closely related to the search user. Thus, next, method 200 proceeds to step S204, where the information item is returned to the user based on the importance of each information item of the one or more information items. Then method 200 ends. Here, the term "importance" is the degree of importance of the information item for the search user. In fact, for a certain information repository, besides that the information items resulting from the search are related to the keyword on which the search is based, they usually imply many objective internal relations stored in the specific information repository. These relations are built, for example without limitation, among the search user, the information item per se and the creator of the information item (hereinafter referred to as a "creator" for concise; in an example that the information item is a document, the creator is also called an author). They each might affect the importance of the information item to the search user and further affect the search result returned to the user. Detailed illustration is presented below with reference to FIG. 3.

Figure 3:
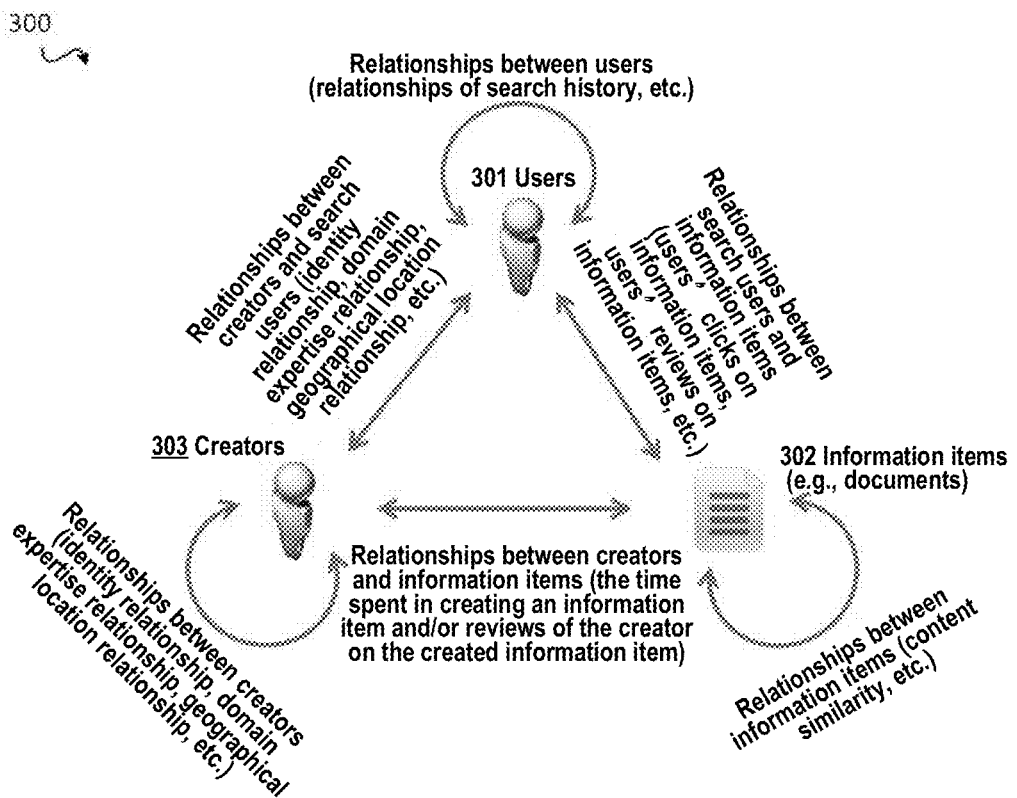
FIG. 3 shows a schematic view of an exemplary relationship 300 among a user, an information item and its creator according to one exemplary embodiment of the present invention.

FIG. 3 shows a schematic view of an exemplary relationship 300 among a user, an information item and its creator according to one exemplary embodiment of the present invention. Exemplary relationship 300 involves a user 301, an information item 302 and its creator 303. They have following relationships that are not leveraged in existing search techniques:

1. The relationships between different creators 303
2. The relationships between creators 303 and users 301
3. The relationships between different users 301
4. The relationships between users 301 and information items 302
5. The relationships between different information items 302
6. The relationships between creators 303 and information items 302

Relationships Between Different Creators 303

The relationships between different information item creators 303 relate to, for example, the department relationship, position relationship, domain expertise relationship, and geographical location relationship, etc. between creators. In an example that the information repository is an information repository within an organization like an enterprise or a company, the creators of internal resources (e.g., authors of documents) are very easy to get, and also the report line or title or domain expertise can be got from the organization profile. Multiple creators 303 may also be put in the same or different geographical groups or technical domain groups, and this kind of information can also be easily retrieved. In addition, the creators have the ability to register themselves to one virtual group based on their interest, or this kind of virtual groups can also be assigned by the system administrator. As different creators within an organization (enterprise or company) have the above relationships between them, their respective roles will affect the importance of their created information items, e.g., a specification written by the Architect should have a higher importance than a junior engineer. Thus, the importance of each information item might be associated with the weight of a creator per se of the information item, where weight may be determined based on, without limitation, one or more of: the creator's department, position, domain expertise, geographical location, the clicks ratio of each information item created by the creator, and historical reviews of each information item created by the creator. The clicks ratio and historical reviews of each information item created by the creator reflect a dynamic impact of the creator's historical behaviors on the creator's weight. As additional usage for the creators' relationship is that, for example, when an information item is returned to search user 301, the creator information of the information item is also returned; in turn, a process may be initiated to find which group is the most possible consulting group, and the group's mail list or the primary contact information will also be returned in together.

Relationships Between Creators 303 and Users 301

Similar to the forgoing, the relationships between creators 303 of the information items and users 301 relate to, for example, the department relationship, position relationship, cooperation relationship, domain expertise relationship, and geographical location relationship between the creators and the search users. Thus, the importance of an information item may also be associated with the relevance between its creator and the search user. The relevance may be built based on, without limitation, one or more of: the department relevance, position relevance, cooperation relationship, domain expertise relationship, and geographical location relevance between the creators and the search users. For example, those information items generated by the creators who have the same business unit or functional group or same region or same virtual groups as the search user will get a higher importance, thereby more accurate results can be returned to the user.

Relationship Between Different Users 301

Similar to the forgoing, the relationships between different users 301 relate to, for example, the search historical relationship between different users 301. The history of a user searching keywords may be stored in the system for further analyzing; the search users who share the most common things are treated as related users; and information items rated by the related users (to be described below) usually have a higher importance. In other words, for a specific search user, the importance of an information item may be associated with the relevance of this search user to other users. The so-called relevance here includes, without limitation, the search historical relationship of the user.

Relationships Between Users 301 and Information Items 302

The relationships between users 301 and information items 302 may involve the interactive relationship between a user acting as the search user and the information item returned through search, such as clicks on the information items and/or reviews of the information items. Usually, search users 301 will click on the returned result for more details, so the 'click' on the result means a relationship between the user and the information item is created. This is the simplest relationship between a search user and a document. The advanced ones include that the user promotes/depromotes the importance of a certain result. For example, the user adds comments to a certain information item in the result. This kind of relationship will be leveraged for reference of the importance of other search results. Thus, the importance of an information item may be associated with users' historical interest on the information item, which historical interest may be built based on, for example, users' click history or review history of the information item. From another perspective, as mentioned in the relationships between different creators 303, when a certain information item 302 is viewed/promoted by many search users 301, the importance of other information items 302 created by creator 303 of this information item will also be promoted. That is, the relationships between users and information items, in turn, affect the relationships between different creators.

Relationships Between Different Information Items 302

Between different information items 302, there also exist relationships that are to be discovered, such as content relevance or similarity between information items. When search results comprising one or more information items are sent to search users 301, users 301 can add tags to the results, and also they can link different results, wherein the default value on the linkage can be "related." The user can also specify a more accurate result like a duplicate for further duplication. In an optional embodiment of the present invention, the determining the content relevance is implemented by the interaction with end users, or by machine learning or based on a (e.g. corporation-optimized taxonomy) classification tool. The impact of the relationship between different information items on the importance of a certain information item might not be direct, which can be implemented as below: information items with relevance are clustered or formed into a set; while building the user's historical interest in information items, having historical interest in one information item in a set is also regarded as having interest in other information items in the set. Users having the same interest can be regarded as "related users," which, in turn, affects the relationships between users.

Relationships Between Creators 303 and Information Items 302

The relationships between creators 303 and information items 302 relate to, for example, the time which a creator spends in creating a certain information item and/or the review of the creator on a certain information item created by himself. In this disclosure, these factors are also referred to as impacts of a creator on created information items. Information items created by the same creator have different importance, and they have different meanings. For example, one document which costs the author one year must have higher value to the whole corporation, and then its final score should be higher than the normal ones. This is the same for those the author most recommends. Therefore, the importance of an information item can further be associated with the impact of a creator of the information item on the created information item.

Internal relationships among the user, information item and creator have been described in detail with reference to FIG. 3. Note that in an optional embodiment of the present invention, initially let an information item (e.g., document) only have an impact of the creator (e.g., author) on the importance, such as impacts of the author's position, domain relationship, the time the author has spent, or the review of the author on the document. With the continuous evolution of the system, more impact factors will take effect. These impact factors may be made and optimized based on the interaction with users and finally reflect the real value of information items such as documents and the like.

Additionally, as described above, the application of the importance of information items in a search result may be implemented with respect to only a part of the search result, for example, a small result set like top 500 results filtered by search keywords, so the workload is not very much. Moreover, preferably some information like the users' weights is not calculated in runtime, but offline, and the total information amount of final weights is not very big, which can be cached in memory and will not cost a long time to compute on them.

Figure 4:
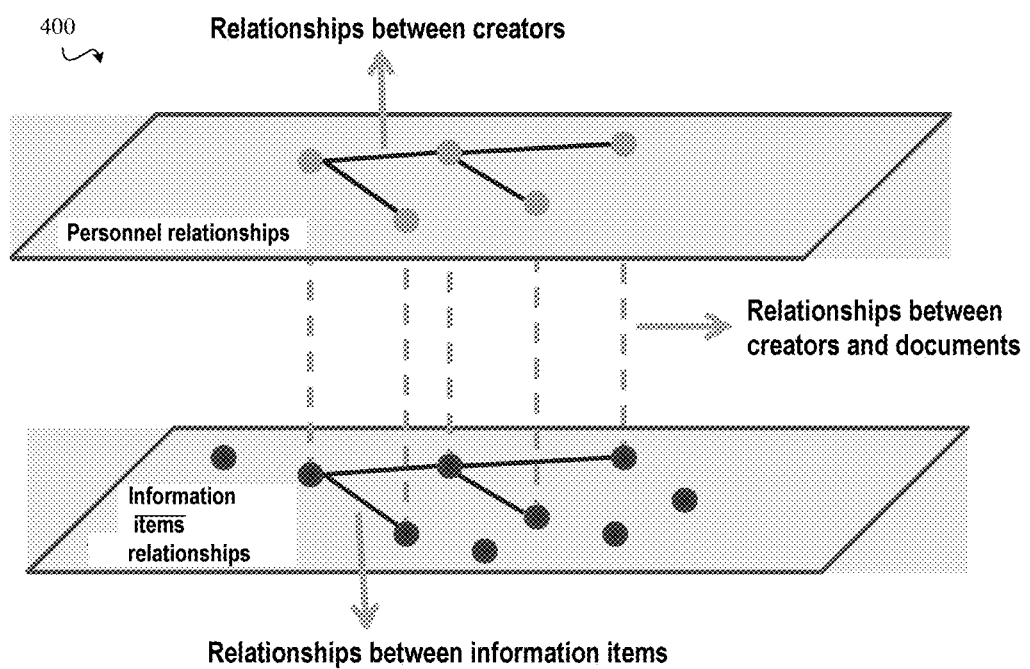
FIG. 4 is a schematic view 400 showing how relationships among the creators will impact those among the information items in the organization of an enterprise according to one embodiment of the present invention.

Further, as described above, the 6 relationships can affect each other, for example, the relationships between the search users and the information items will affect the relationship between different creators. Finally the "ecosystem" of these relationships will reach a balanced status. For example, FIG. 4 is a schematic view 400 showing how the creators' relationships will impact the information items' in the organization of an enterprise according to one embodiment of the present invention. In the enterprise's organization chart, an Architect (A in FIG. 4) has several senior engineers (e.g., B and C in FIG. 4) reporting to him, and these senior engineers also might have junior engineers (e.g., D and E in FIG. 4) reporting to them. The Architect is responsible for the architectural structure, while engineers work on sub components. Then the architectural document (i.e., information item) written by the Architect should have a strong relationship with the component-level documents (i.e., information items) written by the engineers, as shown in FIG. 4.

Figure 5:
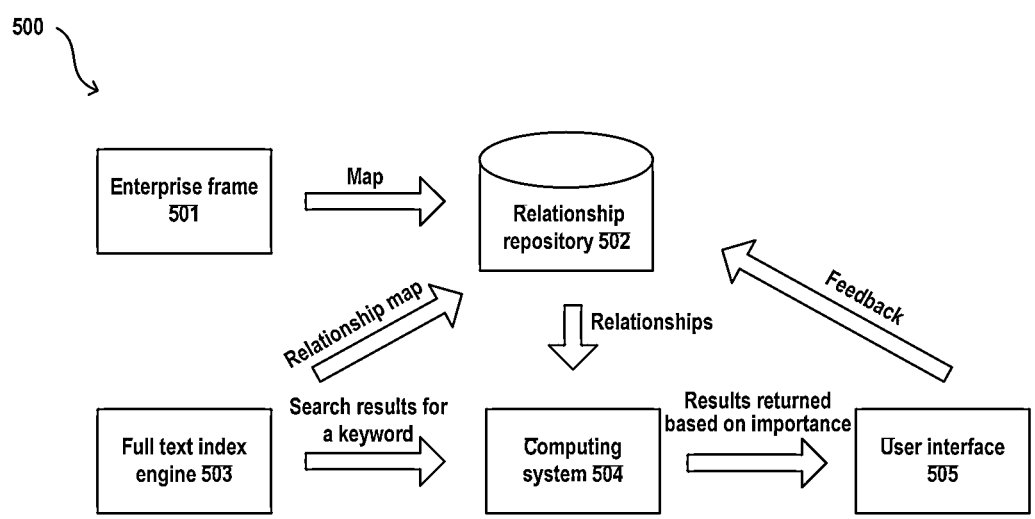
FIG. 5 shows a schematic view of high level data flow 500 according to one embodiment of the present invention.

FIG. 5 shows a schematic view of the high level data flow according to one embodiment of the present invention.

As shown in FIG. 5, prior to search, an enterprise frame 501 such as the organization hierarchy (e.g., the relationships between information item creators, etc.) and the like is mapped to a relationship repository 502. The relationships analyzed by a full text index engine 503 from the index are also synchronized to relationship repository 502. The offline evolved and optimized relationships will be put into a computing system's 504, like the search result processor's, cache for using. As such, when a user does a search, the results hit by search criteria like keywords in full text index engine 503 will not be returned to the search user immediately, but information items will be returned to a user interface 505 according to the importance of the results and based on related content stored in the cache. Besides, the behavior of the search user interacting (including clicking/promoting) with the result will also be put into relationship repository 502, for dynamically evolving the whole system.

Figure 6:
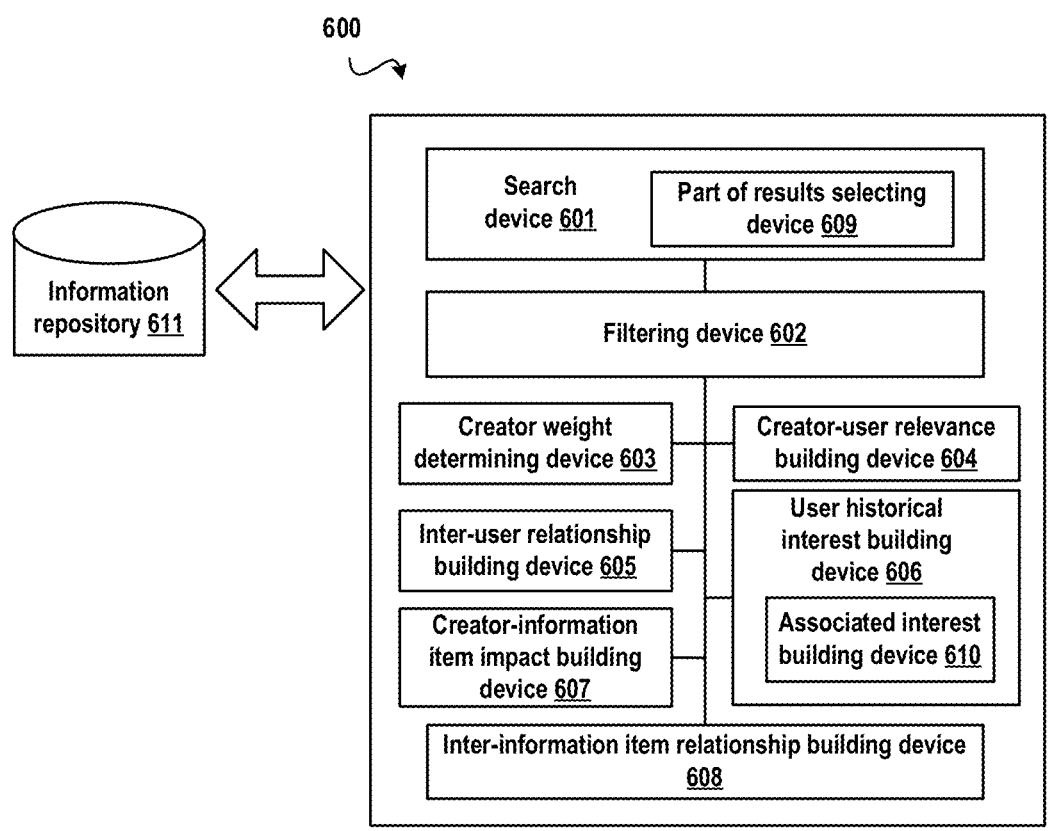
FIG. 6 shows a block diagram of an apparatus 600 for searching information according to the present invention.

With reference to FIG. 6 below, further description is presented to a block diagram of an apparatus 600 for searching information according to one embodiment of the present invention.

As shown in FIG. 6, apparatus 600 comprises: a search device 601 and a filtering device 602, wherein the search device 601 is configured to, in response to receipt of a keyword from a search user of a plurality of users, search in an information repository to obtain one or more information items to be returned; and the filtering device 602 is configured to return the information item to the search user based on an importance of each information item of the one or more information items.

In an optional embodiment of the present invention, the importance of each information item is associated with one or more of: a creator weight of the each information item, relevance between the creator and the search user, relevance between the search user and other users of the plurality of users, relevance among the one or more information items, historical interest of the plurality of users in the one or more information items, and impact of the creator on created information items.

In an optional embodiment of the present invention, apparatus 600 may further comprise: a creator weight determining device 603 configured to determine the creator weight based on one or more of: the creator's department, position, domain expertise, geographical location, a clicks ratio of each information item created by the creator, and a historical review of each information item created by the creator.

In an optional embodiment of the present invention, apparatus 600 may further comprise: a creator-user relevance building device 604 configured to build relevance between the creator and the search user based on one or more of: department relevance, position relevance, cooperation relationship, domain expertise relevance, and geographical location relevance between the creator and the search user.

In an optional embodiment of the present invention, apparatus 600 may further comprise: an inter-user relevance determining device 605 configured to build relevance between the search user and other users of the plurality of users based on a search history relationship between the search user and the other users.

In an optional embodiment of the present invention, apparatus 600 may further comprise: a user historical interest building device 606 configured to build historical interest of the plurality of users in the one or more information items based on a click history of the plurality of users on the information item and/or a review history of the plurality of users on the information item. In a further optional embodiment of the present invention, user historical interest building device 606 may comprise: an associated interest building device 610 configured to, while building the historical interest, determine historical interest in one information item in a set of information items having relevance to each other as historical interest in other information items in the set of information items.

In an optional embodiment of the present invention, apparatus 600 may further comprise: a creator-information item impact building device 607 configured to build the impact of the creator on each created information item based on time which the creator spends in creating the information item and/or a review of the creator on each created information item.

In an optional embodiment of the present invention, apparatus 600 may further comprise: an inter-information item relationship building device 608 configured to build relevance among the one or more information items based on content relevance among the one or more information items.

In an optional embodiment of the present invention, the content relevance may be determined by users, machine learning and/or a classification tool.

In an optional embodiment of the present invention, search device 601 further comprises: a part of results selecting device 609 configured to take a part of all search results for the keyword that are most closely related to the keyword as the one or more information items to be returned.

In an optional embodiment of the present invention, filtering device 602 is further configured to also return to the user creator information of the information item while returning the information item to the user.

In an optional embodiment of the present invention, information repository 611 comprises an information repository for internal usage of an organization, and/or the information item comprises a document.

The various embodiments of the present invention have been described above. It can be seen from the foregoing description that the search method and apparatus according to the present invention discover, in depth, internal and objective relationships among the information item, the information item creator and the search user, and apply these relationships to information item search, so that an information item is returned based on the importance of the information item and the accuracy of search is improved. Meanwhile, the method and apparatus according to the present invention may be dynamically evolving so that the method and apparatus have the technical effect of self-learning and perfecting.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for providing search results to a user within an organization, the organization having a repository of information, comprising:
   in response to receipt of a keyword from a search user of a plurality of users, searching in the information repository to obtain one or more information items, wherein use of the information repository is enabled to create a historical interest of items within the information repository to correlate items within the information repository;
   ordering according to relevance the plurality of information items by evaluating on an information item-by-information item basis an interrelationship between each of:
   (a) the search user and the plurality of users within the organization;
   (b) a creator of the information item being evaluated and a plurality of creators within the organization;
   (c) the information item being evaluated and the plurality of information items;
   (d) the search user and the information item being evaluated;
   (e) the search user and the creator of the information item being evaluated;
   (f) the creator of the information item being evaluated and the information item being evaluated; and
   (g) the historical interest of the item being evaluated; and
   providing an ordered plurality of information items to the search user.

2. The method according to claim 1, wherein ordering according to relevance further comprises evaluating a creator weight of the information item being evaluated a historical interest of the plurality of users in the one or more information items, or an impact of the creator of the information item being evaluated on the plurality of information items.

3. The method according to claim 2, wherein the creator weight is determined based on one or more of: the creator's department, position, domain expertise, geographical location, a clicks ratio of each information item created by the creator, and a historical review of each information item created by the creator.

4. The method according to claim 1, wherein the relevance between the creator of the information item being evaluated and the search user is built based on one or more of: department relevance, position relevance, cooperation relationship, domain expertise relevance, and geographical location relevance between the creator of the information item being evaluated and the search user.

5. The method according to claim 2, wherein the relevance between the search user and other users of the plurality of users is built based on a search history relationship between the search user and the other users.

6. The method according to claim 2, wherein the historical interest of the plurality of users in the one or more information items is built based on a click history of the plurality of users on the information item and/or a review history of the plurality of users on the information item.

7. The method according to claim 6, wherein while building the historical interest, historical interest in one information item in a set of information items having relevance to each other is determined as historical interest in other information items in the set of information items.

8. The method according to claim 2, wherein the impact of the creator of the information item being evaluated on the plurality of information items is built based on time which the creator spends in creating the information item being evaluated.

9. The method according to claim 2, wherein the relevance among the one or more information items is built based on content relevance among the one or more information items.

10. The method according to claim 1, wherein the relevance of the information item being evaluated is determined by users, machine learning and/or a classification tool.

11. The method according to claim 1, wherein the searching in an information repository to obtain one or more information items to be returned further comprises:
   taking a part of all search results for the keyword that are most closely related to the keyword as the one or more information items to be returned.

12. The method according to claim 1, wherein providing an ordered plurality of information items to the search user further comprises providing returning the information item to the user, creator information for each of the plurality of information items to the user.

13. The method according to claim 1, wherein the information item comprises a document.

14. A system for providing search results to a user within an organization, the organization having a repository of information, comprising:
   a processor;
   memory coupled to the processor; and
   computer-executable program logic encoded in memory of one or more computers enabled to search for information using the processor and memory, wherein the computer-executable program logic is configured for the execution of:
   in response to receipt of a keyword from a search user of a plurality of users, searching in the information repository to obtain one or more information items, wherein use of the information repository is enabled to create a historical interest of items within the information repository to correlate items within the information repository;
   ordering according to relevance the plurality of information items by evaluating on an information item-by-information item basis an interrelationship between each of:
      (h) the search user and the plurality of users within the organization;
      (i) a creator of the information item being evaluated and a plurality of creators within the organization;
      (j) the information item being evaluated and the plurality of information items;
      (k) the search user and the information item being evaluated;
      (l) the search user and the creator of the information item being evaluated;
      (m) the creator of the information item being evaluated and the information item being evaluated; and
      (n) the historical interest of the item being evaluated; and
   providing an ordered plurality of information items to the search user.

15. The system according to claim 14, wherein ordering according to relevance further comprises evaluating a creator weight of the information item being evaluated, a historical interest of the plurality of users in the one or more information items, or an impact of the creator of the item being evaluated on the plurality of information items.

16. The system according to claim 15, wherein the computer-executable program logic is further configured for the execution of:
   determining the creator weight based on one or more of: the creator's department, position, domain expertise, geographical location, a clicks ratio of each information item created by the creator, and a historical review of each information item created by the creator.

17. The system according to claim 14, wherein the computer-executable program logic is further configured for the execution of:
   building the relevance between the creator of the information item being evaluated and the search user based on one or more of: department relevance, position relevance, cooperation relationship, domain expertise relevance, and geographical location relevance between the creator of the information item being evaluated and the search user.

18. The system according to claim 15, wherein the computer-executable program logic is further configured for the execution of:
   building the relevance between the search user and other users of the plurality of users based on a search history relationship between the search user and the other users.

19. The system according to claim 15, wherein the computer-executable program logic is further configured for the execution of:
   building the historical interest of the plurality of users in the one or more information items based on a click history of the plurality of users on the information item and/or a review history of the plurality of users on the information item.

20. The system according to claim 19, wherein the building of the historical interest further comprises:
   while building the historical interest, determining historical interest in one information item in a set of information items having relevance to each other as historical interest in other information items in the set of information items.

* * * * *